United States Patent
Sobajima et al.

[11] 3,776,588
[45] Dec. 4, 1973

[54] SAFETY ARRANGEMENT FOR VEHICLE BODY CLOSURE STRUCTURES

[75] Inventors: Katsunobu Sobajima; Kiyoto Matsuzaki, both of Yokohama City, Japan

[73] Assignee: Nissan Motor Company, Limited, Yokohama City, Japan

[22] Filed: Sept. 27, 1971

[21] Appl. No.: 184,084

[30] Foreign Application Priority Data
Dec. 24, 1970   Japan.............................. 45/130463

[52] U.S. Cl. .................................. 296/146, 49/483
[51] Int. Cl. ............................................... B60j 5/04
[58] Field of Search .......................... 296/28 R, 146; 49/483, 489, 502; 292/DIG. 39, DIG. 40, DIG. 41, DIG. 65

[56] References Cited
UNITED STATES PATENTS

| | | | |
|---|---|---|---|
| 2,833,589 | 5/1958 | Ahrens .......................... | 296/28 R X |
| 1,902,499 | 3/1933 | Herreshoff ..................... | 49/483 X |
| 2,080,714 | 5/1937 | Hicks et al. .................... | 296/146 |
| 2,709,612 | 5/1955 | Fox .............................. | 292/DIG. 41 |
| 2,752,015 | 6/1956 | Nolan ........................... | 49/483 |
| 3,183,548 | 5/1965 | Speakman ..................... | 244/129 D X |

*Primary Examiner*—Benjamin Hersh
*Assistant Examiner*—Leslie J. Paperner
*Attorney*—John Lezdey

[57] ABSTRACT

A safety arrangement of motor vehicle bodies free from collapse by an external transverse force including two coactive engaging means having at least two peripheral crests and corresponding peripheral grooves engageable with each other. The two coactive engaging means are formed either in opposite peripheral structural members of the vehicle body wall defining an opening for a vehicle door or in a corresponding portion of the vehicle door. The transverse force due to, for example, side collision of the vehicle is born by the two engaging means when it is applied to the vehicle door, thus precluding a danger of the vehicle occupant's being hurt by the intruded or deflected vehicle door.

1 Claim, 1 Drawing Figure

PATENTED DEC 4 1973
3,776,588
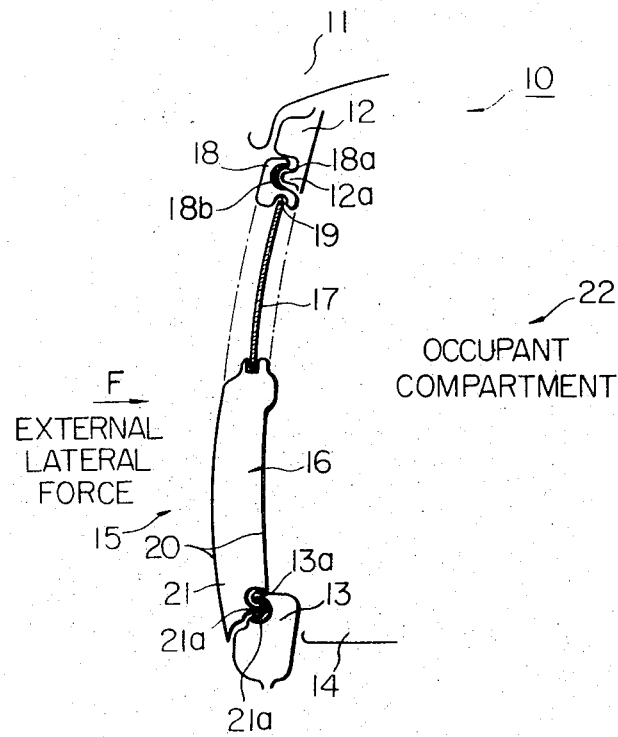
INVENTORS
KATSUNOBU SOBAJIMA + KIYOTO MATSUZAKI
BY John Leyden
ATTORNEY

SAFETY ARRANGEMENT FOR VEHICLE BODY CLOSURE STRUCTURES

This invention relates to vehicle body construction and more particularly to a safety arrangement of motor vehicle bodies.

It is a current practice in motor vehicle construction to provide an overlap between the periphery of a vehicle door and corresponding peripheral structural members of the vehicle body when the vehicle door is closed. This overlapping or superimposition will easily disappear when a sudden transverse force or stress is applied onto the vehicle door. Such transverse force, which is in the tranverse direction relative to the vehicle but is perpendicular to the vehicle door, is experienced in the vehicle door when a side collision takes place. Since the superimposition has no mechanical connection, the vehicle door will collapse inwardly by the transverse force, thus inviting sudden intrusion of its central portion into the occupant compartment. As a result, vehicle occupants are always exposed to danger of being hurt by the intruded vehicle door in case of the side collision.

It is therefore an object of this invention to provide a safety arrangement for motor vehicle bodies free from collapse by an external transverse force due to a side collision of the motor vehicle.

Another object of this invention is to provide a safety arrangement for motor vehicle bodies including two coactive engaging means having at least two peripheral crests and corresponding peripheral grooves engageable with each other and formed either in opposite peripheral structural members of the vehicle body wall or in a corresponding portion of the vehicle door for bearing a transverse force applied to the vehicle door.

Still another object is to provide safety arrangement for motor vehicle bodies of the above-described type further including shock absorbing and sealing means attached to at least one of the two coactive engaging means for partially absorbing mechanical shocks due to the transverse force and for sealing the vehicle door to intercept any water from entering the occupant compartment.

The accompanying drawing is a sectional view showing through a door pillar a vehicle body incorporating this invention.

In the drawing, the vehicle 10 is shown to include a roof panel 11, body header structure 12, base sill structure 13, and a floor panel 14. The vehicle body 10 is provided with at least one door opening 15 defined or encompassed by a body wall having peripheral structural members including the body header structure 12, base sill structure 13 and door pillars (not shown). Closure structures, such as a front or rear door 16, are pivotally attached to the door pillar and mounted in each opening 15 for swinging movement between closed and open positions but are depicted in the drawing as in their closed position. The door 16 is provided with a side window 17, door header structure 18 having a channel portion 19 for receiving an upper end of the side window 17, external and internal door panels 20 for accommodating therein the side window 17 when it is opened, and door base structure 21 opposite to the door header structure 18. In the drawing is seen the left side of a motor vehicle, so that the right side of the vehicle body 10 is an occupant compartment 22 in which a vehicle occupant is seated.

The body header structure 12 and the base sill structure 13 are extensions respectively of the roof panel 11 and of the floor panel 14 and are arranged longitudinally of the motor vehicle. The door pillar (not shown) is made integral with the two structures 12 and 13 is arranged vertically of the motor vehicle. As is well known, the door 16 is conventionally attached to the door pillar or another peripheral structural member, just providing a peripheral overlap between the door periphery and the corresponding body wall when the door 16 is in a closed position.

According to a main feature of this invention, there are provided two coactive engaging means, one of which is a groove 18a and crest 21a respectively formed in the door header structure 18 and door base structure 21 at their sides facing the vehicle body 10. The other of the coactive engaging means is a corresponding crest 12a and groove 13a respectively formed in the body header structure 12 and base sill structure 13 for respectively engaging with the corresponding groove 18a and crest 21a. With these construction arrangements, the door 16 will slightly warp or deflect into the occupant compartment 22 when an external transverse force F, as shown in the drawing, is applied thereto. In this instance, however, the crests 12a and 21a are tightly received by the grooves 18a and 13a, thus providing a high resistance to stretching of the door 16. Consequently, excess deformation of the door 16 and therefore intrusion of the door 16 into the occupant compartment 22 are prevented with much safety to guard the vehicle occupant.

Some modifications of the crest and groove arrangements can be made as will be understood in the following. The two pairs of crest and groove, as numbered 12a, 18a, and 21a, 13a, may be positioned respectively vice versa. In addition, such pairs may be provided in the two peripheral structural members longitudinally opposite to each other in which instance one of the structural members is the door pillar. It is, moreover, quite natural that such pairs of crest and groove may be formed in the whole periphery of the door 16 and corresponding peripheral structural members.

According to another feature of the invention, at least one resilient member, as shown in the drawing as 18b and 13b, is disposed between the two pairs 12a, 18a and 21a, 13a for partially absorbing mechanical shocks due to the transverse force F and for sealing the opening 15 to intercept any water from entering it. In order to improve the sealing performance, it is preferable that such pairs are formed in the whole periphery of the door 16 and corresponding peripheral structural members.

What is claimed is:

1. A door structure of a vehicle body comprising an upper peripheral structure member, a base sill and pillars defining a door opening, said upper peripheral structure member and said base sill having respective closure surfaces directed to the exterior of the body, closure structure, having an interior surface and an exterior surface, mounted on said body structure for swinging movement through said door opening between closed and opened positions, said upper peripheral member having a crest and said base sill having a groove, said crest and said groove being disposed on said member and said sill in a position facing outwardly towards the exterior of the vehicle but lying inwardly of the exterior surface of said member and said sill, said closure structure having a groove and a crest on its upper and lower sides respectively, said groove and said crest on said closure structure being disposed on said closure structure in a position facing towards the interior surface of said closure structure but not extending thereto, and said groove and said crest on said closure structure being adapted, when said closure structure is in its closed position, to engage respectively with said crest and groove on said upper peripheral structure member and said sill in order to restrain movement of said closure structure when subjected to transverse force applied to said closure structure.

* * * * *